(12) United States Patent
Kanhere et al.

(10) Patent No.: US 9,417,855 B2
(45) Date of Patent: Aug. 16, 2016

(54) INSTRUCTION AND LOGIC TO PERFORM DYNAMIC BINARY TRANSLATION

(75) Inventors: Abhay S. Kanhere, Fremont, CA (US);
Paul Caprioli, Hillsboro, OR (US);
Koichi Yamada, Los Gatos, CA (US);
Suriya Madras-Subramanian, Sunnyvale, CA (US); Suresh Srinivas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,400

(22) PCT Filed: Sep. 30, 2011

(86) PCT No.: PCT/US2011/054380
§ 371 (c)(1),
(2), (4) Date: Jun. 18, 2013

(87) PCT Pub. No.: WO2013/048468
PCT Pub. Date: Apr. 4, 2013

(65) Prior Publication Data
US 2013/0283249 A1    Oct. 24, 2013

(51) Int. Cl.
*G06F 9/45* (2006.01)
*G06F 9/30* (2006.01)
(Continued)

(52) U.S. Cl.
CPC .............. *G06F 8/40* (2013.01); *G06F 9/30109* (2013.01); *G06F 9/30185* (2013.01); *G06F 9/384* (2013.01); *G06F 9/3836* (2013.01); *G06F 9/3857* (2013.01); *G06F 9/3877* (2013.01); *G06F 9/3887* (2013.01);
(Continued)

(58) Field of Classification Search
CPC .............. G06F 8/45; G06F 8/51; G06F 8/52; G06F 8/456; G06F 9/45516
See application file for complete search history.

(56) References Cited

U.S. PATENT DOCUMENTS 6,031,992 A    2/2000   Cmelik et al.
6,289,506 B1   9/2001   Kwong et al.
(Continued)

FOREIGN PATENT DOCUMENTS

WO    2013/048468 A1    4/2013

OTHER PUBLICATIONS

Ottoni et al., "Harmonia: A Transparent, Efficient, and Harmonious Dynamic Binary Translator Targeting the Intel® Architecture", 2011 ACM, CF'11, May 3-5, 2011, Ischia, Italy, pp. 1-12; <http://dl.acm.org/citation.cfm?doid=2016604.2016635>.*
(Continued)

*Primary Examiner* — Thuy Dao
*Assistant Examiner* — Ben C Wang
(74) *Attorney, Agent, or Firm* — Vecchia Patent Agent, LLC

(57) ABSTRACT

A micro-architecture may provide a hardware and software co-designed dynamic binary translation. The micro-architecture may invoke a method to perform a dynamic binary translation. The method may comprise executing original software code compiled targeting a first instruction set, using processor hardware to detect a hot spot in the software code and passing control to a binary translation translator, determining a hot spot region for translation, generating the translated code using a second instruction set, placing the translated code in a translation cache, executing the translated code from the translated cache, and transitioning back to the original software code after the translated code finishes execution.

19 Claims, 13 Drawing Sheets

(51) Int. Cl.
*G06F 9/38* (2006.01)
*G06F 9/455* (2006.01)

(52) U.S. Cl.
CPC .............. *G06F 9/4552* (2013.01); *G06F 8/456* (2013.01); *G06F 8/51* (2013.01)

(56) References Cited

U.S. PATENT DOCUMENTS

| | | | |
|---|---|---|---|
| 6,415,379 | B1 | 7/2002 | Keppel et al. |
| 6,430,668 | B2 | 8/2002 | Belgard |
| 7,290,253 | B1* | 10/2007 | Agesen ..................... G06F 8/52 717/154 |
| 7,350,200 | B2 | 3/2008 | Lueh et al. |
| 7,506,217 | B2* | 3/2009 | Borin et al. ..................... 714/51 |
| 7,516,453 | B1* | 4/2009 | Bugnion ............. G06F 9/45504 717/138 |
| 7,757,221 | B2* | 7/2010 | Zheng et al. .................. 717/136 |
| 8,146,106 | B2 | 3/2012 | Kim et al. |
| 8,255,882 | B2 | 8/2012 | Zhang et al. |
| 8,296,749 | B2 | 10/2012 | Zhao et al. |
| 8,479,176 | B2 | 7/2013 | Ottoni et al. |
| 8,762,127 | B2 | 6/2014 | Winkel et al. |
| 8,893,280 | B2 | 11/2014 | Jung et al. |
| 2005/0086451 | A1 | 4/2005 | Yates, Jr. et al. |
| 2006/0294508 | A1* | 12/2006 | Berkowits et al. ............ 717/136 |
| 2007/0079304 | A1* | 4/2007 | Zheng ................. G06F 9/45516 717/151 |
| 2008/0134159 | A1* | 6/2008 | Guo et al. ..................... 717/154 |
| 2008/0141012 | A1 | 6/2008 | Yehia et al. |
| 2009/0217020 | A1* | 8/2009 | Yourst ............................ 712/245 |
| 2010/0274972 | A1 | 10/2010 | Babayan et al. |
| 2011/0119526 | A1 | 5/2011 | Blumrich et al. |
| 2011/0131372 | A1* | 6/2011 | Knippel .............. G06F 9/45516 711/109 |
| 2011/0167416 | A1* | 7/2011 | Sager et al. .................... 717/149 |
| 2013/0086299 | A1* | 4/2013 | Epstein ............... G06F 12/1475 711/6 |
| 2013/0262838 | A1* | 10/2013 | Al-Otoom ................ G06F 8/52 712/225 |
| 2013/0305019 | A1* | 11/2013 | Caprioli et al. ................ 712/205 |
| 2013/0311758 | A1* | 11/2013 | Caprioli ................ G06F 9/3842 712/233 |
| 2014/0095832 | A1* | 4/2014 | Haber ........................ G06F 8/52 712/205 |
| 2014/0156933 | A1* | 6/2014 | Shaikh et al. ................. 711/123 |
| 2014/0281376 | A1* | 9/2014 | Yamada ................ G06F 9/3885 712/28 |

OTHER PUBLICATIONS

Branković et al., Performance analysis and predictability of the software layer in dynamic binary translators and optimizers; 2013 ACM, CF'13, May 2013; pp. 1-10; <http://dl.acm.org/citation.cfm?id=2482786&CFID=596178674&CFTOKEN=59232788>.*

Xu et al., "A Dynamic Binary Translation Framework Based on Page Fault Mechanism in Linux Kernel", 2010 IEEE, CIT'10, Jun. 2010; pp. 2284-2289; <http://ieeexplore.ieee.org/stamp/stamp.jsp?tp=&arnumber=5578325>.*

Guan et al., "A Runtime Profile Method for Dynamic Binary Translation Using Hardware-Support Technique", 2009 IEEE, ICISE2009, Dec. 2009; pp. 4683-4687; <http://ieeexplore.ieee.org/stamp/stamp.jsp?arnumber=5455266>.*

Ding-Yong Hong, "Efficient and Retargetable Dynamic Binary Translation", National Tsing Hua University, Apr. 2013; pp. 1-102; <http://www.iis.sinica.edu.tw/papers/dyhong/18701-F.pdf>.*

International Search Report issued on Mar. 1, 2012, for counterpart International Application No. PCT/US2011/054380.

Office Action received for Taiwan Patent Application No. 101135588, mailed on Feb. 15, 2015, 6 pages of English Translation and 6 pages of Taiwan Office Action.

International Preliminary Report on Patentability and Written Opinion Received for PCT Patent Application No. PCT/US2011/054380, mailed on Apr. 10, 2014, 8 pages.

Klaiber, A., "Low-Power X86-Compatible Processors Implemented With Code Morphing Software", Transmeta Corporation, Jan. 2000, 18 pages.

Office Action received for Taiwan Patent Application No. 101135588, mailed on Aug. 24, 2015, 4 pages of English Translation and 5 pages of Taiwan Office Action.

* cited by examiner

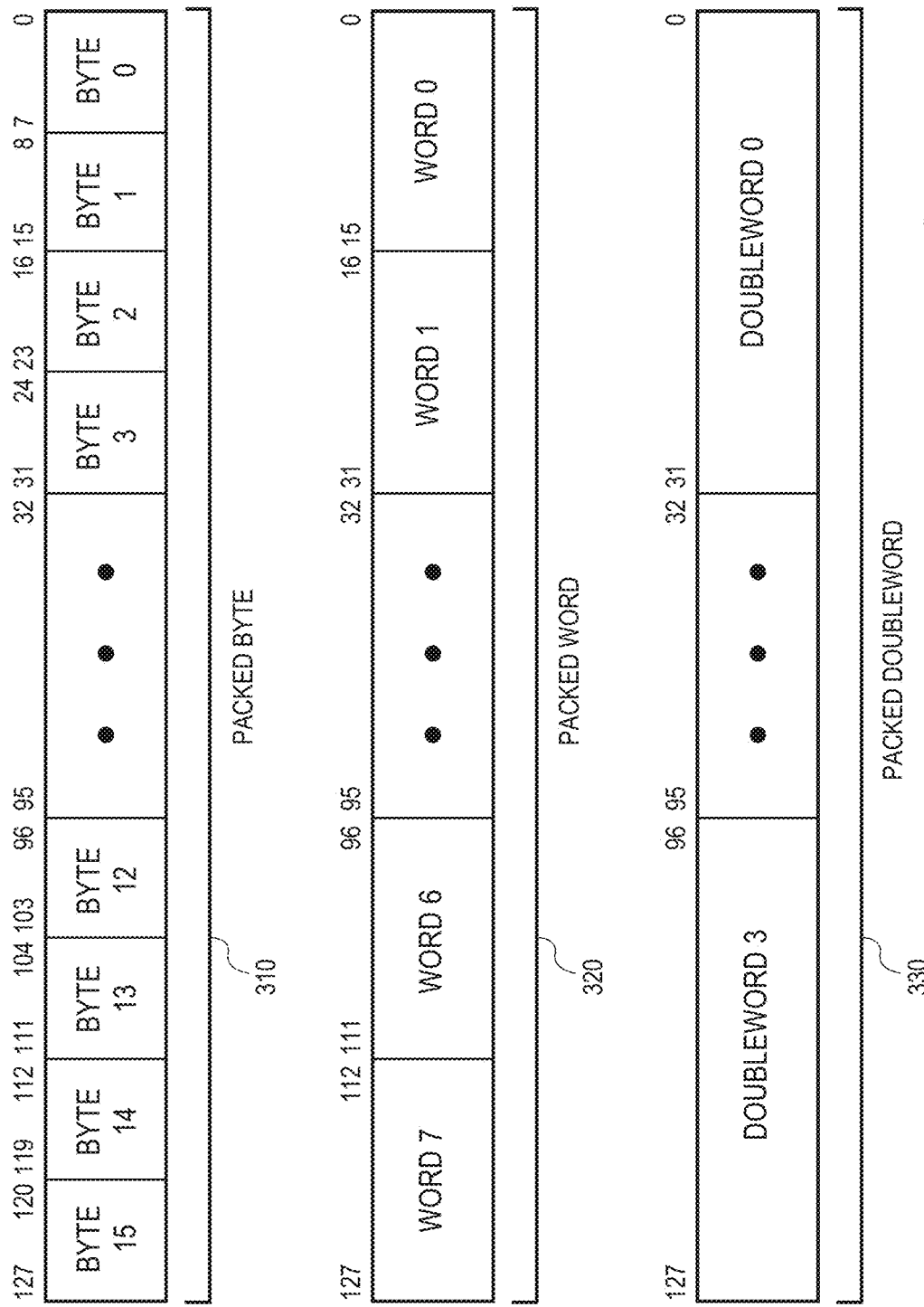

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | • | • | • | bbbb bbbb | bbbb bbbb | bbbb bbbb |

UNSIGNED PACKED BYTE REPRESENTATION 344

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | • | • | • | sbbb bbbb | sbbb bbbb | sbbb bbbb |

SIGNED PACKED BYTE REPRESENTATION 345

| 127 | 112 111 | | 16 15 | 0 |
|---|---|---|---|---|
| wwww wwww wwww wwww | • | • • | wwww wwww wwww wwww | |

UNSIGNED PACKED WORD REPRESENTATION 346

| 127 | 112 111 | | 16 15 | 0 |
|---|---|---|---|---|
| swww wwww wwww wwww | • | • • | swww wwww wwww wwww | |

SIGNED PACKED WORD REPRESENTATION 347

| 127 | 92 91 | 32 31 | 0 |
|---|---|---|---|
| dddd dddd dddd dddd dddd dddd dddd dddd | • • • | dddd dddd dddd dddd dddd dddd dddd dddd | |

UNSIGNED PACKED DOUBLEWORD REPRESENTATION 348

| 127 | 92 91 | 32 31 | 0 |
|---|---|---|---|
| sddd dddd dddd dddd dddd dddd dddd dddd | • • • | sddd dddd dddd dddd dddd dddd dddd dddd | |

SIGNED PACKED DOUBLEWORD REPRESENTATION 349

FIG. 3C

INSTRUCTION AND LOGIC TO PERFORM DYNAMIC BINARY TRANSLATION

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Computer programs are normally compiled into executables with a specific instruction set for a particular computer processor architecture. This causes a problem for the computer processor venders, independent software vendors (ISVs) and computer operation system vendors (OSVs) because each time a new generation of processors is introduced, these vendors have to spend a lot of engineering resources as well as monetary resources to help to support the old computer programs to run on the new computer processors.

Several approaches exist to run the executables compiled for one instruction set on a computer processor implementing a different instruction set or an improved instruction set (e.g., to take advantage of new hardware features). In one approach, the underlying computer processor translates all executable codes to the instruction set provided by the underlying computer processor. In another approach, when executables compiled for an old generation of a computer processor are ported to a new generation of the computer processor with an improved instruction set, only hotspots in a program are re-optimized by hardware, or alternatively, the operating system has to enable support for the new features/instructions. This first approach has a severe startup latency because the whole executable needs to be interpreted to native code run by the underlying processor. The hardware oriented scheme, however, requires significant hardware (e.g., store-order preserving re-order buffer (ROB) based atomicity model). The operating system support approach needs a lot of engineering resources and monetary resources as described above.

Accordingly, there is a need in the art to provide a new method and apparatus for binary translation to optimize the code to take advantage of the new instructions or hardware features. This optimization may be provided even if the operating system (OS) does not support the new instructions or new hardware features.

DESCRIPTION OF THE FIGURES

Embodiments are illustrated by way of example and not limitation in the Figures of the accompanying drawings:

FIG. 3A illustrates packed data types according to one embodiment;

FIG. 3C illustrates packed data types according to one embodiment;

DETAILED DESCRIPTION

Figure 1A:
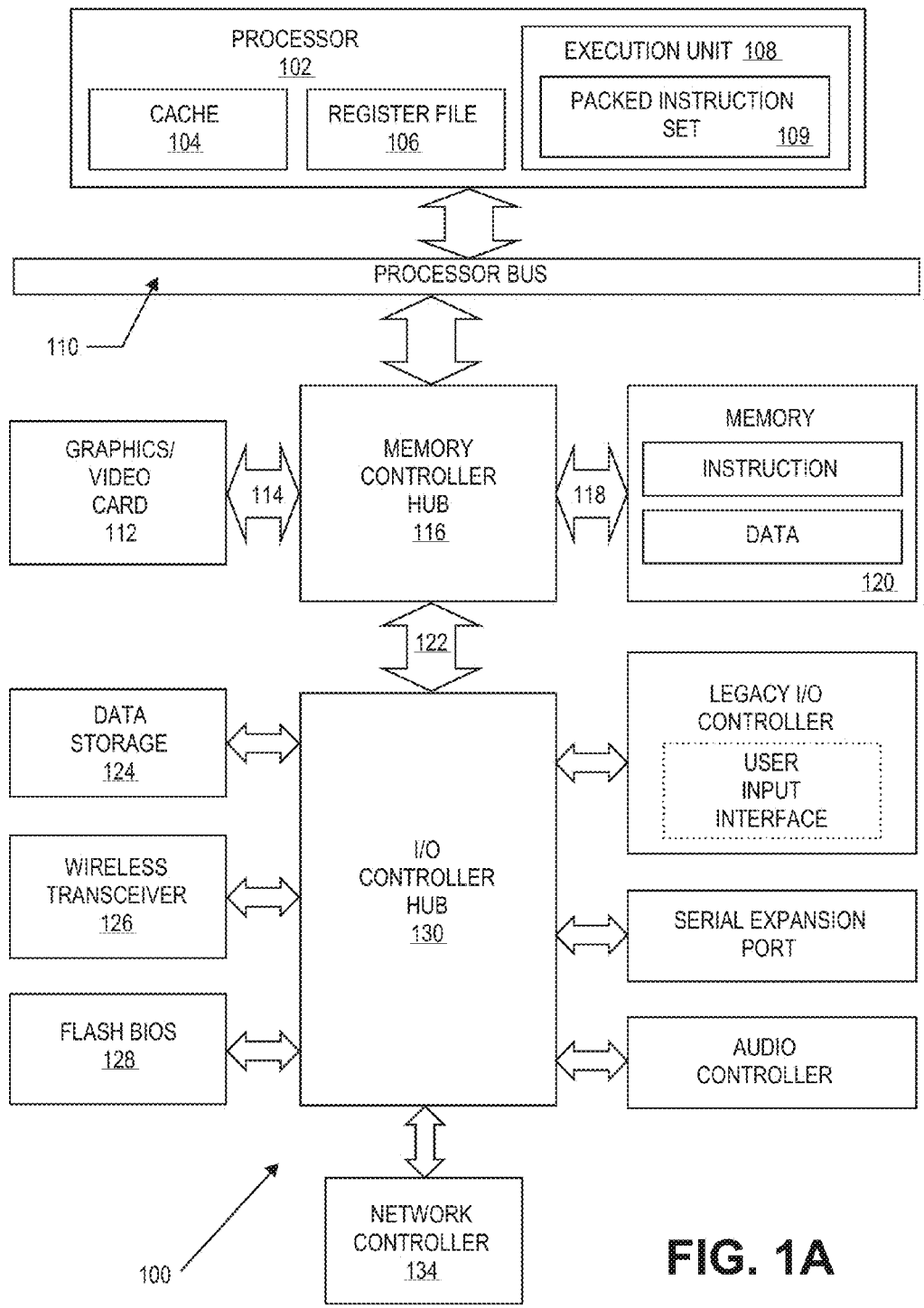
FIG. 1A is a block diagram of a system according to one embodiment.

The following description describes an instruction and processing logic to perform dynamic binary translation within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may be a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM™ III, PENTIUM™ 4, Xeon™, Itanium™, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and LINUX for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
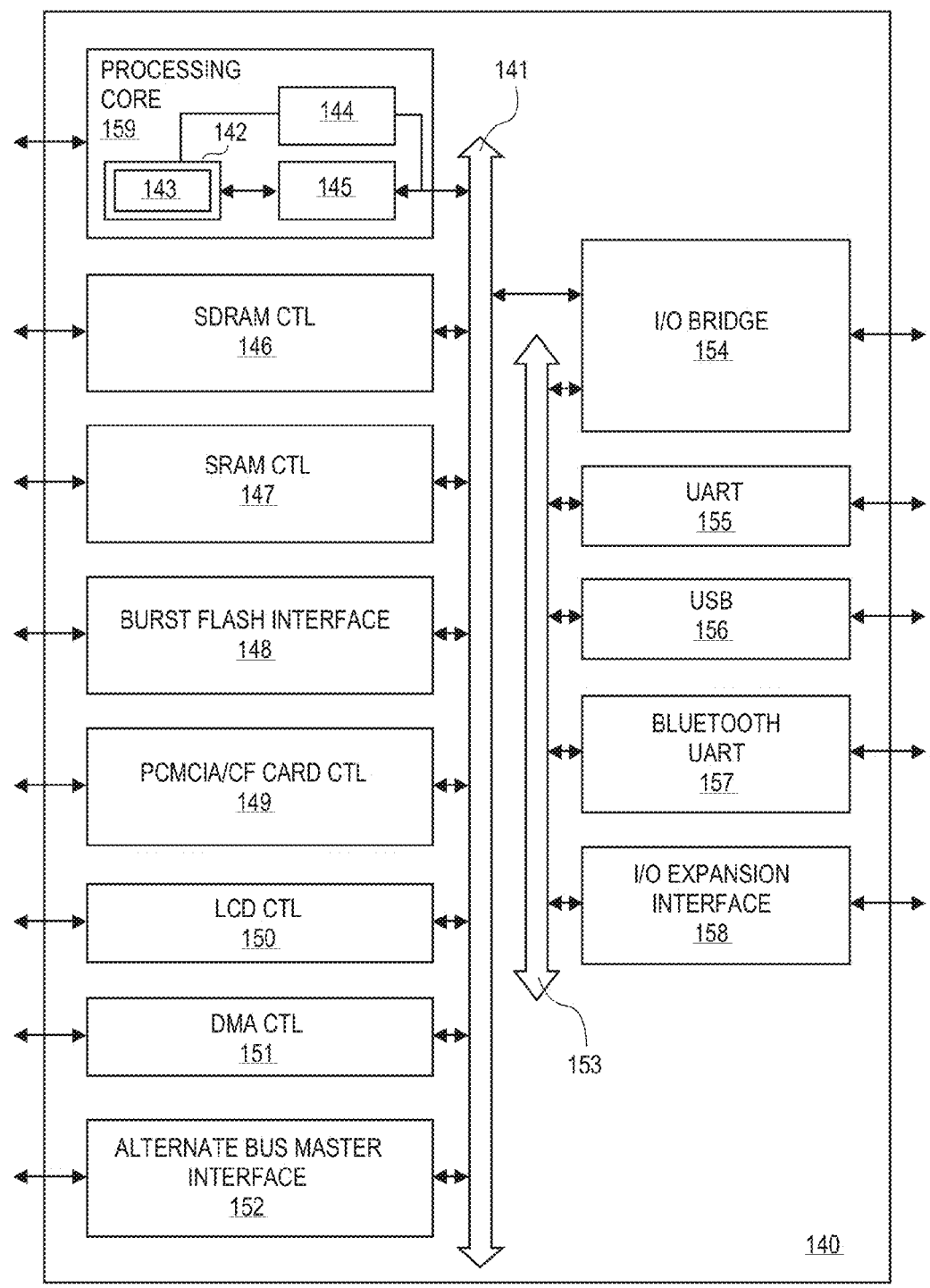
FIG. 1B is a block diagram of a system according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
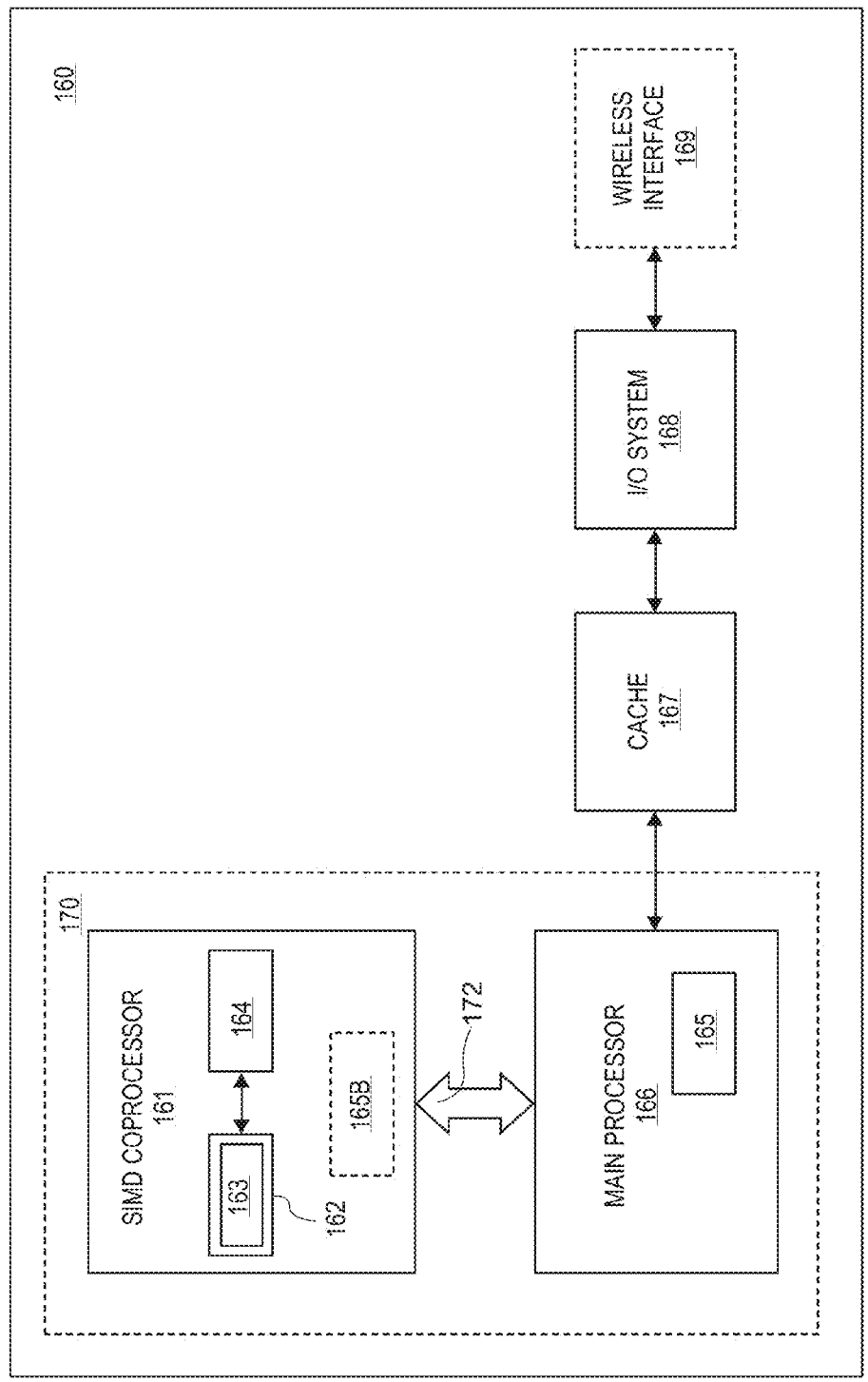
FIG. 1C is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 172 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
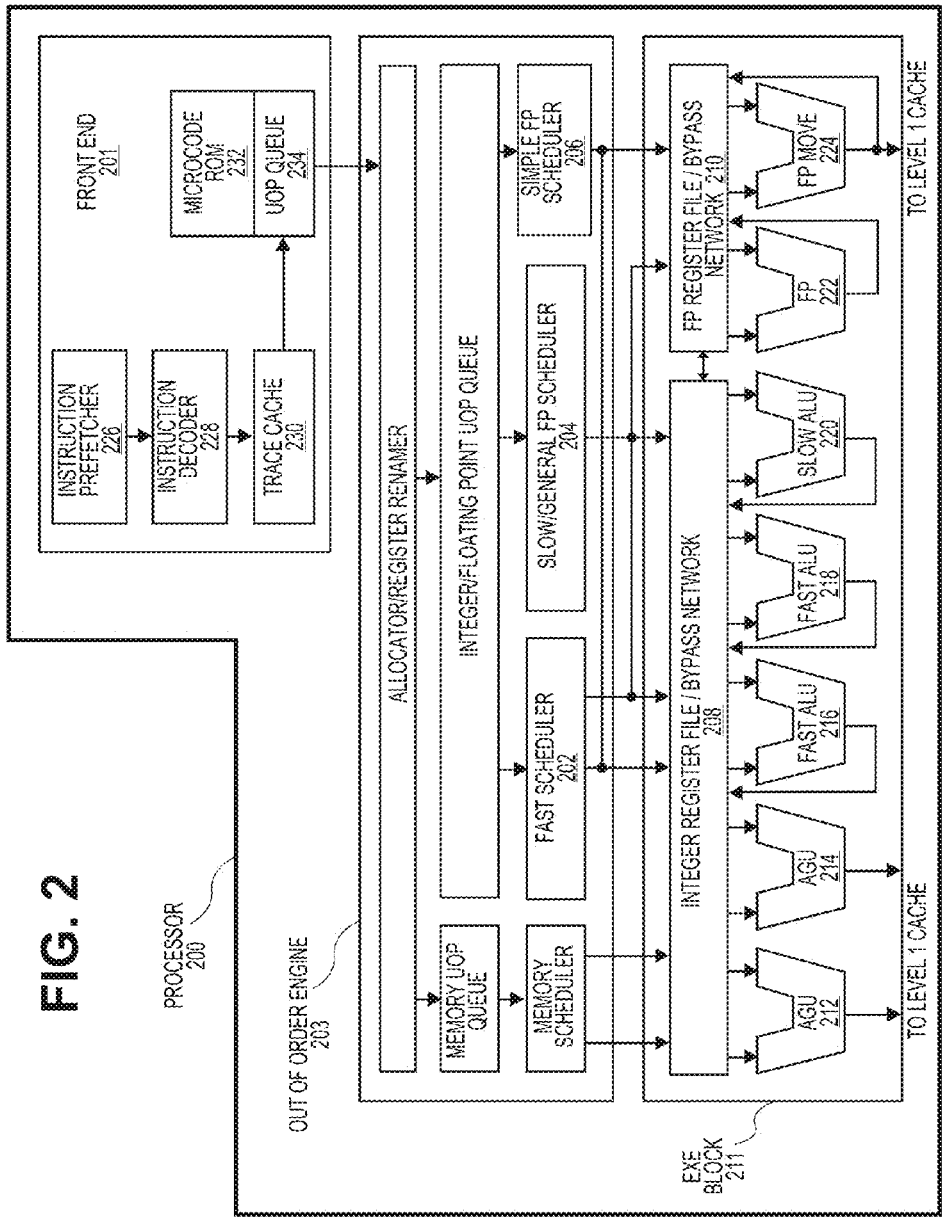
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, ..., and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
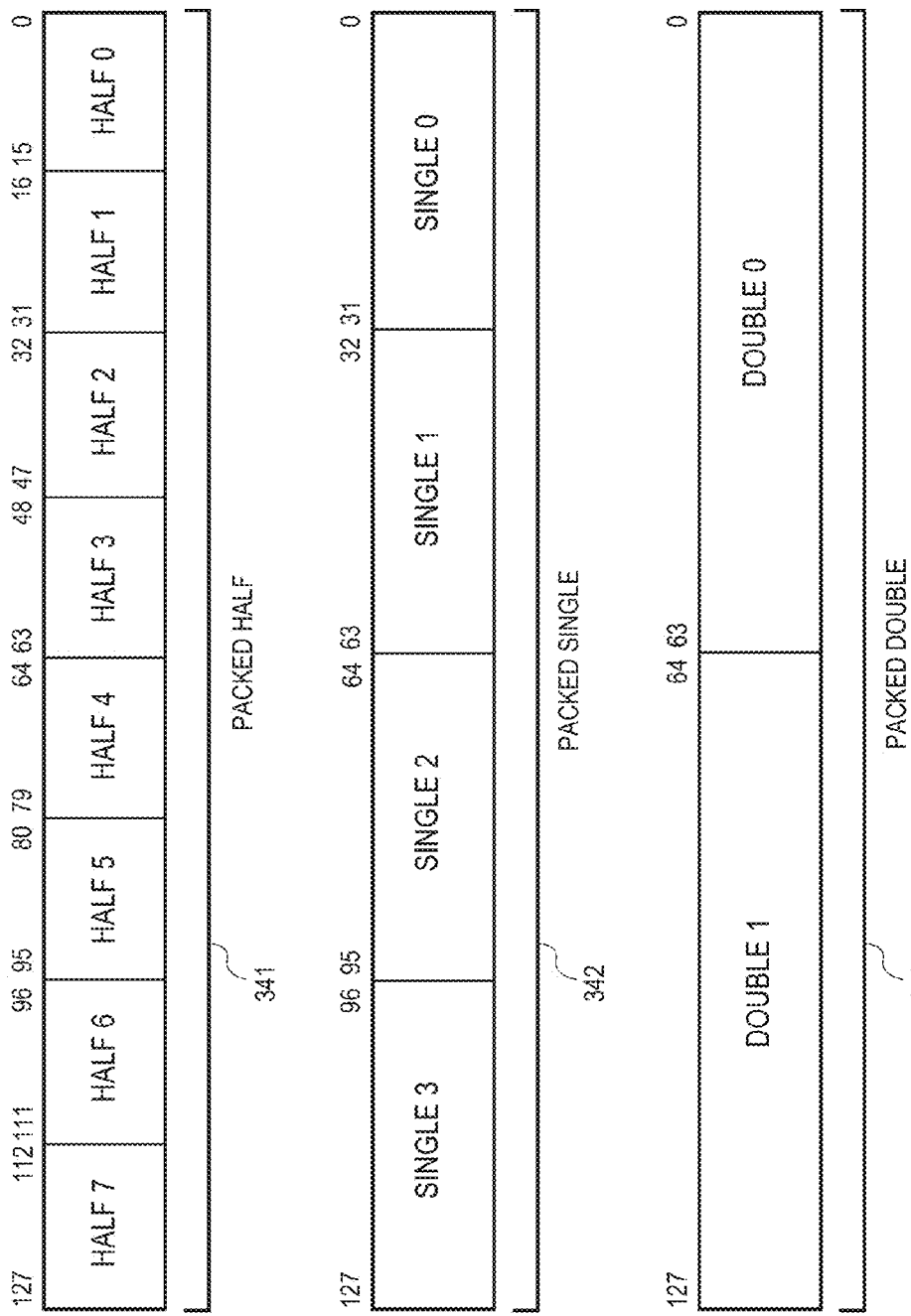
FIG. 3B illustrates packed data types according to one embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

Figure 3D:
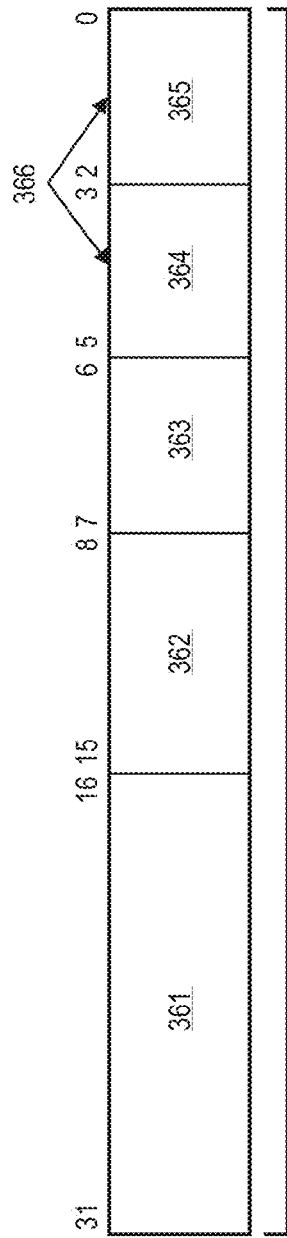
FIG. 3D illustrates an instruction encoding according to one embodiment.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

Figure 3E:
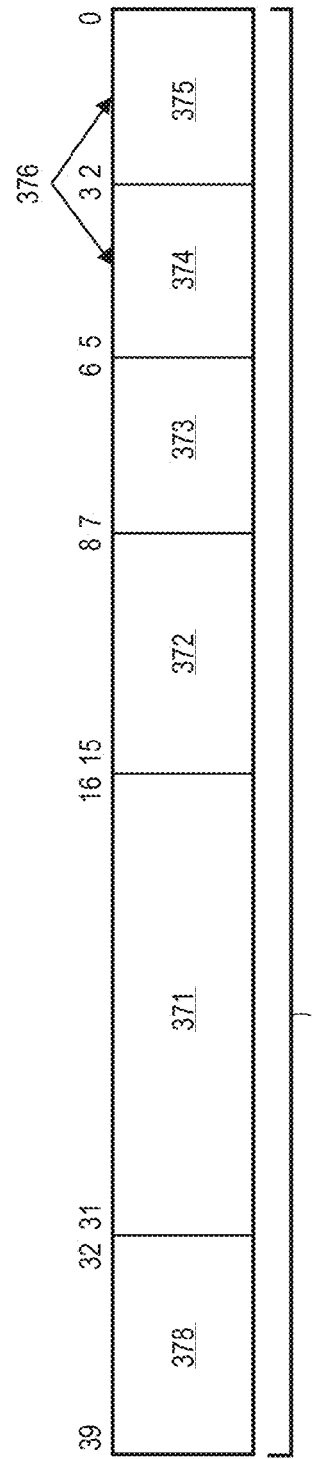
FIG. 3E illustrates an instruction encoding according to one embodiment.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
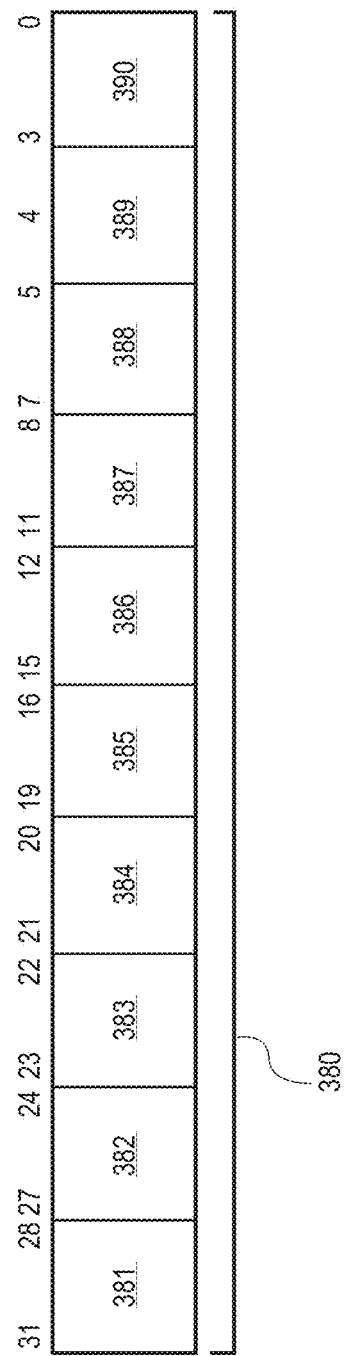
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

In addition to XMM registers that may be 128 bits long, other embodiments of the present invention may provide wider registers, such as, but not limited to, YMM registers of 256 bits, or other registers of 512 bits, 1024 bits, etc. These other embodiments of the present invention may provide extensions to the x86 instruction set, such as Advanced Vector Extensions (AVX), and other extensions on top of AVX (e.g., AVX2, or AVX3), which may take advantage of the wider registers. That is, new instructions in AVX, AVX2, or AVX3 may use operands that contain more packed bytes, words, doublewords using those wider registers of 256 bits, 512 bits, 1024 bits, etc.

Figure 4A:
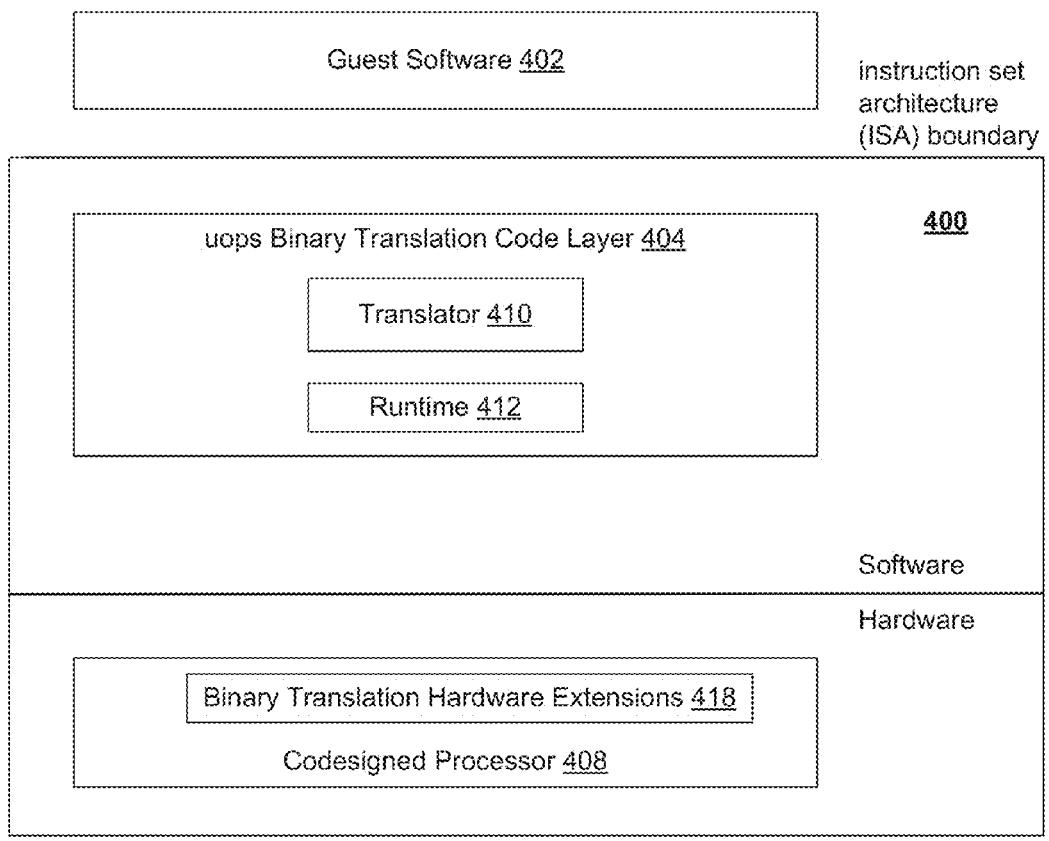
FIG. 4A illustrates elements of a hardware and software co-designed dynamic binary translation for a micro-architecture according to one embodiment.

As described above, each instruction of a compiled software program may be rendered into one or more microcode (uops) by a decoder of a processor. These microcode translations may be transparent to the OS and VMM layers. Embodiments of the present invention may further provide a hardware and software co-designed dynamic binary translation that may transparently translate some microcode of one instruction set to microcode for a different instruction set. FIG. 4A is a depiction of elements of a hardware and software co-designed dynamic binary translation for a micro-architecture 400 according to one embodiment. As shown in FIG. 4A, guest software 402 may execute on top of an instruction set architecture (ISA) boundary of the micro-architecture 400 according to an embodiment. The micro-architecture 400 may comprise software and hardware elements to perform dynamic binary translation. The software elements may comprise a binary translation code layer 404. The hardware elements may comprise a co-designed processor 408 that may include binary translation hardware extensions 418.

The binary translation hardware extensions 418 may include a performance monitoring unit (PMU). The PMU may implement a hardware hotspot detection mechanism. In one embodiment, the PMU may pseudo-randomly sample (scalar or packed) SSE instructions and capture a relative instruction point (RIP) and Last Branch Record (LBR) into a buffer. The PMU may also track if the same region has been attempted before and decided it was not profitable (blacklist). The binary translation hardware extensions 418 may also include a mechanism (method and/or circuitry) to enter and exit translated code. For example, the binary translation hardware extensions 418 may ensure jumps from the original code cannot transfer control to arbitrary locations. For details about transfer control, see U.S. patent application Ser. No. 13/996,352, the content of which is incorporated in its entirety by reference herein.

The binary translation hardware extensions 418 may further include a mechanism (method and/or circuitry) to ensure translation consistency. That is, for example, the binary translation hardware extensions 418 may implement self modifying/cross modifying code detection to ensure that translated code is always consistent with the original code/loop it represents. Self modifying code (SMC) may refer to modification of code translated by an binary code optimizer (e.g., translator 410). This may includes change in page mapping by operating system such that virtual addresses map to different physical addresses. Cross-modifying code (XMC) may refer to modification of code translated by an binary code optimizer (e.g., translator 410) from another processor. Together these may be covered by notion of 'translation consistency'—i.e. the code that an optimizer has optimized may be still unmodified such that the translated code still has same behavior and execution semantics as the original code.

The binary translation hardware extensions 418 may also implement a memory disambiguation mechanism (method and/or circuitry), for example, data aliasing detection (detecting specific pair of loads and stores conflict). The binary translation hardware extensions 418 may also include an atomicity support, which may allow reordered computation and memory accesses to be indistinguishable from original program order following memory ordering for IA. The binary translation hardware extensions 418 may also include a runtime monitoring ucode that handles exceptions and rollbacks from atomicity mechanism as well as monitors execution for hotspots and manages overheads.

Once the performance monitoring hardware identifies hot regions of code that contain (scalar or packed) SSE instructions, the binary translation software may be invoked to identify a target loop by analysis of code pages. The binary translation code layer 404 may include a translator 410 and a runtime 412.

Auto-vectorization is a program transformation that converts a Single instruction stream program into Single Instruction Multiple Data (SIMD) program using SIMD (vector) instructions. The translator 410 may analyze the code bytes and automatically translate the code to use new instructions to take advantage of new features provided by the underlying processor 408. For example, the translator 410 may be a vector widening (VW) optimizer. The VW optimizer may analyze the code bytes, identify a loop, perform loop analysis to compute dependencies and vectorization strategy with software checks for disambiguation, and automatically vectorizes the loop to use wider hardware vector instructions to take advantage of wider registers provided by the processor (e.g., translate the code from using XMM register to use YMM register). The VW optimizer may support both inter-iteration as well as intra-iteration widening of computation and memory accesses (load/stores) within the loop. Therefore, in one embodiment, the processor implementing the instruction set architecture transparently enables legacy scalar or legacy vector (SSE) code to utilize wider vectors. This may allow new processor with wider vector to deliver value at launch for applications compiled for previous processor generations without reliance on OSV, ISV enabling.

The runtime 412 may manage overheads (rollbacks, time spent in translations) within a design threshold to ensure net positive performance. In one embodiment, the runtime 412 may be an event based system (can be implemented as a software thread or microcode) that responds to variety of system level events that affect the binary code translation such as: a) detection and analysis of hotspots, b) management of the translation cache where the translated code is stored, c) monitoring and managing overheads associated with translation, profiling etc., and d) information regarding SMC/XMC detected by the hardware, repeated atomic region abort information, and associated removal/disabling of the translations. This thin software/microcode layer may provide a set of services to the translator/optimizer, and interfaces with hardware support.

Figure 4B:
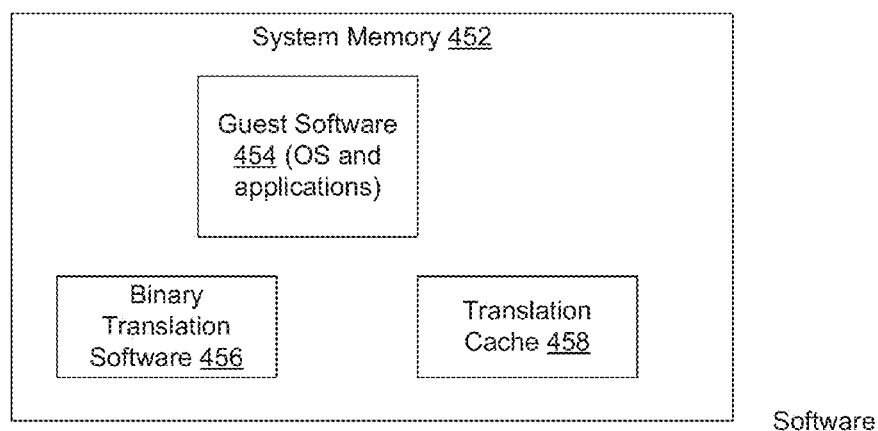
FIG. 4B illustrates elements of a hardware and software co-designed dynamic binary translation for a micro-architecture according to one embodiment.
Figure 4B:
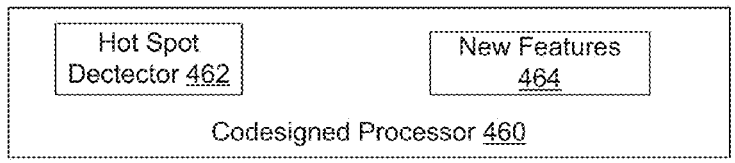

FIG. 4B illustrates elements of a hardware and software co-designed dynamic binary translation for a micro-architecture according to one embodiment. As shown in FIG. 4B, the software may include a system memory 452, which may comprise guest software 454, binary translation software 456, and translation cache 458. The binary translation software 456 and translation cache 458 may be software elements of a micro-architecture 450 according to the present invention.

The micro-architecture 450 may further include a codesigned processor 460 that may comprise a hot spot detector 462 and new features 464. In one embodiment, the guest software 454 may be identical or similar to the guest software 402 of FIG. 4A. The guest software 454 may be compiled using a specific instruction set and may be an OS or any other software running on the OS (including another OS running on a virtual machine that is managed by a virtual machine manager).

The binary translation software 456 of the micro-architecture 400 may comprise software of the binary translation code layer 404, such as, the translator 410 and the runtime 412. The hot spot detector 462 may be a PMU as described above with respect to the binary translation hardware extensions 418. The new features 464 may include wider registers (e.g., 256 bits, 512 bits or 1024 bits), and other features described above with respect to the binary translation hardware extensions 418 (circuitry to enter and exit translated code, circuitry to ensure translation consistency, circuitry for memory disambiguation, circuitry for an atomicity support, circuitry for the runtime monitoring ucode).

Figure 4C:
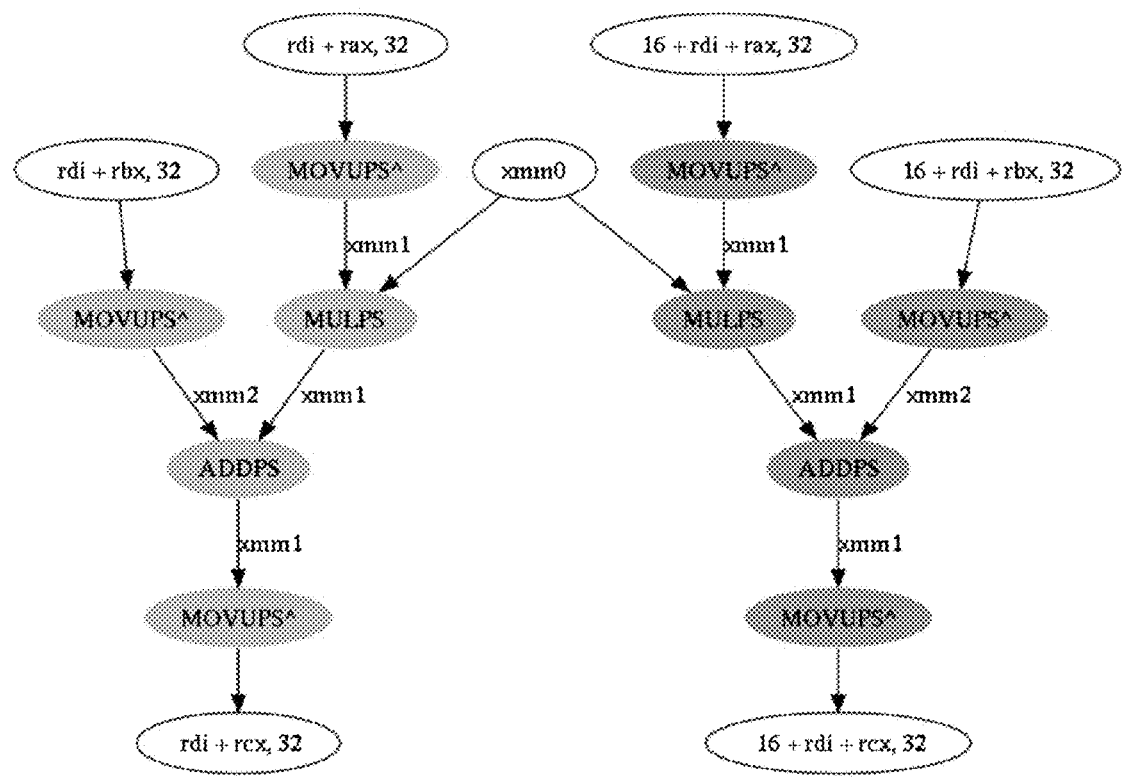
FIG. 4C illustrates an example flow path identified by a hardware and software co-designed dynamic translation according to one embodiment.

FIG. 4C illustrates an example flow path 480 for a Single Precision SAXPY (Alpha*X+Y) identified by a micro-architecture (e.g., 400 and or 450) implementing a hardware and software co-designed dynamic binary translation according to one embodiment. SAXPY is a combination of scalar multiplication and vector addition, $$z = \alpha X + Y,$$

where $\alpha$ is a scalar, and X and Y are vectors, and all $\alpha$, X and Y are of single precision. The example flow path 480 may be a Data Flow Graph identified by the translator 410 from analysis of the application code bytes. In one embodiment, the memory references may be represented in canonical form.

The following is a table showing the original code along with the translated code that may be generated and executed by a processor implementing a hardware and software co-designed binary translation according to one embodiment.

TABLE 1

Original Code and Translated Code

| Original Loop | Vector widened Loop |
|---|---|
| Loop: xmm1 = MOVUPS ds:(rax+rdi*0x1) | Atomic region begin |
| xmm1 = MULPS xmm1, xmm0 | ... initialization code ... |
| xmm2 = MOVUPS ds:(rbx+rdi*0x1) | Loop: Atomic region end |
| xmm1 = ADDPS xmm1, xmm2 | Atomic region begin |
| ds:(rcx+rdi*0x1) = MOVUPS xmm1 | ymm1 = VMOVUPS ds:(rax+rdi*0x1) |
| xmm1 = MOVUPS ds:0x10(rax+rdi*0x1) | ymm1 = VMULPS ymm1, ymm0 |
| xmm1 = MULPS xmm1, xmm0 | ymm2 = VMOVUPS ds:(rbx+rdi*0x1) |
| xmm2 = MOVUPS ds:0x10(rbx+rdi*0x1) | ymm1 = VADDPS ymm1, ymm2 |
| xmm1 = ADDPS xmm1, xmm2 | ds:(rcx+rdi*0x1) = VMOVUPS ymm1 |
| ds:0x10(rcx+rdi*0x1) = MOVUPS xmm1 | rdi_0, COSPAZ = ADD rdi_0, 0x20 |
| rdi_0, COSPAZ = ADD rdi_0, 0x20 | COSPAZ = CMP rdi_0, rdx_0 |
| COSPAZ = CMP rdi_0, rdx_0 | JL Loop, OFlag, Sflag |
| JL Loop, OFlag, Sflag | ... exit cleanup code ... |
| | Atomic region end |

As shown in the above table, the left hand column may include the original code that uses XMM registers and instructions that include MOVUPS, MULPS, ADDPS, etc. The right hand column may include the code translated by a translator (e.g., translator 410) that uses YMM registers, and instructions that include VMOVUPS, VMULPS, VADDPS to operate on YMM registers. The translated code may include atomic regions for initialization code and the loop that uses translated code. In one embodiment, the translation may be transparent and performed dynamically by the micro-architecture (e.g., 400 and or 450). That is, an embodiment may utilize dynamic optimization technology to transform hot loops within the microprocessor without involvement of Operating System/VMM or application. This embodiment may allow hidden binary translation (BT) layer to optimize the code to use wider vector hardware even if VMM does not expose availability of wider-vector registers to guest code. This optimization may occur even if OS does not support saving state for wider vector registers.

Figure 5:
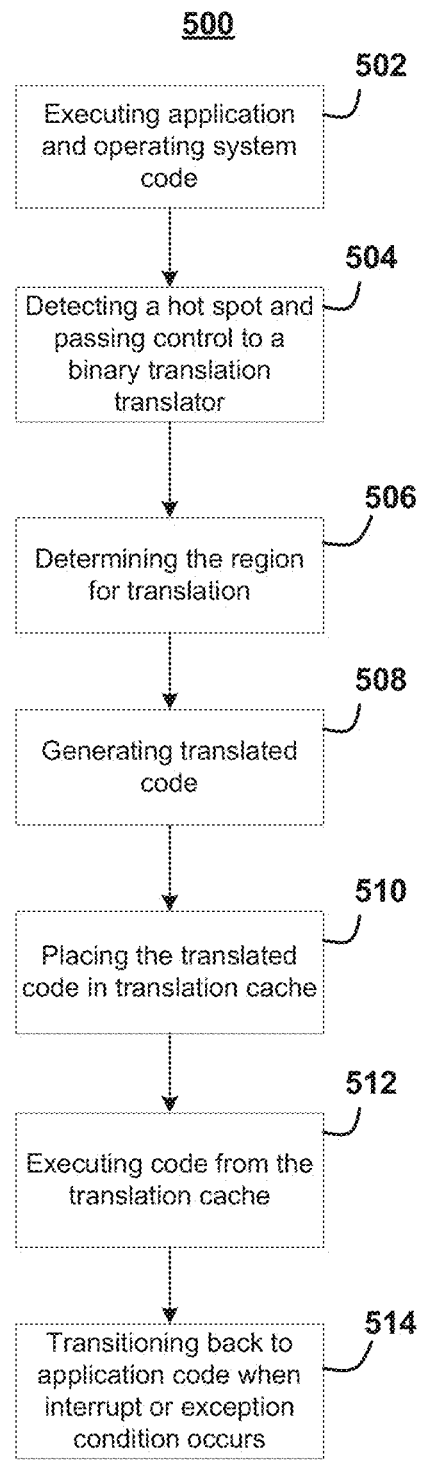
FIG. 5 illustrates a flow diagram for operations to be performed for a process according to one embodiment.

FIG. 5 illustrates a flow diagram of operations to be performed for a process 500 according to one embodiment. The process 500 may start at block 502, at which application and operating system code may be executed. As described above, for example, in a processor, instructions may be received and decoded by a decoder and queued up to be executed by a functional unit. At block 504, a hot spot may be detected by the processor and control may be passed to a binary translation translator. At block 506, the translator may determine the region for translation. For example, a loop may be identified and the loop analysis may be performed. Then, at block 508, translated code may be generated. For example, as shown in table 1 above, the translated code corresponding to the original code may be generated. At block 510, the translated code may be placed in a translation cache. For example, the translated code may be placed in a portion of the system memory designated as the translation cache. At block 512, the translated code from the translation cache may be executed. The translated code may take advantage of wider registers provided by the processor, and thus, have a better performance than the original code. In one embodiment, the translated code may be executed with a commit and rollback mechanism. That is, the translated code may be executed but any results may be temporarily stored in a cache (e.g., a register or memory). The results may be committed only if no interruptions or exceptions occur for the whole piece of the translated code. If any interruptions or exceptions occur before the execution of the whole piece of the translated code is finished, any saved results may be discarded and any finished execution may be rolled back to a state before the execution of the translated code. At block 514, when interrupt or exception condition occurs the executing may be transitioned back to the original code. The interrupt or exception condition may also cause any execution to rollback.

A micro-architecture implementing a hardware and software co-designed dynamic binary translation according to an embodiment of the present invention may be different from prior approaches in significant ways. For example, the micro-architecture according to an embodiment of the present invention may be a lower cost technology that exploits and incrementally enhances restricted Transactional Memory (RTM) support present existing processor technologies. The micro-architecture according to an embodiment of the present invention may also leverage PMU support, novel page based entry scheme, and new hardware and software co-designed memory disambiguation method exposed to a binary translator. It may rely on less hardware support and focus instead on loop vectorization.

In one embodiment, the hotspot detection may use a lower overhead PMU based mechanism as compared to full featured frame predictors in other implementations. In addition, the micro-architecture according to an embodiment of the present invention may feature an advanced Loop Optimizer with support for fp-precise full loop vectorization transformation and a well-developed profitability model. Moreover, the micro-architecture according to an embodiment of the present invention may feature a runtime capable of managing overheads (rollbacks, time spent in translations) within a design threshold to ensure net positive performance and may feature a new hardware and software co-designed memory disambiguation support distinct from support in other implementations.

The micro-architecture according to an embodiment of the present invention may provide a technology that differs from compiler/tool auto-vectorizers. As described above, the micro-architecture according to an embodiment of the present invention may perform bit-precise FP precise optimizations while existing compilers do not vectorize loops but merely keep FP precision same as original code. That is, the existing compilers typically has a relaxed FP precision mode as the default mode. Moreover, the micro-architecture according to an embodiment of the present invention may implement a dynamic optimization scheme as compared to static optimizations done by existing compilers and may have access to dynamic information including control-flow graph (trace of execution).

The micro-architecture according to an embodiment of the present invention may further differ from other just-in-time (JIT) compilers such as JAVA JIT or Managed runtime optimizers featuring auto-vectorization. For example, the micro-architecture according to an embodiment of the present invention may use speculative optimizations preserving IA program order, fp precision, and transparent to end user. In contrast, Managed runtimes are application binary optimizers and are not transparent to end user. Further, the micro-architecture according to an embodiment of the present invention may optimize traces from x86 code to vectorized code using hardware speculation support. This is different from vectorization of Java byte code to x86 code in application mode.

Embodiments of the present invention involve a microprocessor that may perform dynamic binary translation using a hardware and software co-designed binary translation. Microprocessors according to an embodiment may automatically optimize running code to use vector instructions without enabling OS and without recompilation of application. Further, microprocessors according to an embodiment may support large number of applications optimized for wider vector instructions at launch of new microprocessor. Moreover, microprocessors according to an embodiment may exploit wider vector registers even if application is unable to use these due to CPUID defeaturing (showing no support for wider vector feature) by VMM or due to lack of state save/restore support from OS.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method comprising:
executing original software code compiled targeting a first instruction set;
detecting a hot spot in the original software code with a performance measuring unit of processor hardware;
passing control to a binary translation translator after detecting the hot spot;
determining a hot spot region for translation, wherein the determined hot spot region for translation is a loop, wherein determining the loop comprises identifying the loop with binary translation software, and wherein the binary translation software analyzes code in the loop and vectorizes the loop to use wider hardware vector instructions;
generating translated code; and
storing the translated code in a translation cache;
executing the translated code from the translation cache, wherein the translated code includes both instructions that are included in the first instruction set and instructions that are not included in the first instruction set, and wherein the instructions that are not included in the first instruction set represent an extension of the first instruction set; and
transitioning back to executing the original software code compiled targeting the first instruction set.

2. The method of claim 1, wherein executing the translated code includes executing the translated code that uses wider vectors than those used by the original software code.

3. The method of claim 1, wherein executing the translated code includes executing the translated code with a commit and rollback mechanism, and further comprising discarding results of the execution of the translated code when one of an interrupt and an exception occurs before the execution of the translated code completes.

4. The method of claim 1, further comprising ensuring with the processor hardware that jumps from the original software code to the translated code do not transfer control to arbitrary locations.

5. The method of claim 1, wherein the performance measuring unit is to pseudo-randomly sample instructions of the original software code to detect the hot spot.

6. The method of claim 1, further comprising:
supporting memory disambiguation with the processor hardware;
supporting atomicity with the processor hardware; and
ensuring consistency of translation with the processor hardware.

7. A processor on a die comprising:
execution units to execute instructions of original software code compiled targeting a first instruction set;
a performance measure unit to detect a hot spot in the original software code, wherein control is to be passed to a binary translation translator after the detection of the hot spot,
wherein logic of the binary translation translator is to determine a hot spot region for translation, wherein the logic to determine the hot spot region for translation comprises logic to determine the hot spot region which is to be a loop,
wherein the loop is to be identified by binary translation software, and wherein the binary translation software is to analyze code of the loop and vectorize the loop to use wider hardware vector instructions,
wherein logic of the binary translation translator is to generate the translated code, and
wherein logic of the binary translation translator is to place the translated code in a translation cache;
said execution units also to execute the translated code, which is to have been generated by the binary translation translator, from the translation cache,
wherein the translated code is to include both instructions that are included in the first instruction set and instructions that are not included in the first instruction set.

8. The processor of claim 7, wherein the instructions that are not included in the first instruction set are to represent an extension of the first instruction set.

9. The processor of claim 7, wherein the execution units are to execute the translated code with wider vectors than vectors that are to be used by the original software code.

10. The processor of claim 9, wherein the execution units are to execute the translated code with at least 512-bit vectors, and wherein widest vectors that are to be used by the original software code are to have no more than 256-bits.

11. The processor of claim 7, wherein the execution units are to execute the translated code on registers which are not visible to original software code from which the translated code has been derived.

12. The processor of claim 7, wherein the execution units are to execute the translated code on registers even when an operating system and a virtual machine monitor do not support saving and restoring state to the registers.

13. The processor of claim 7, wherein the processor is to execute the translated code with a commit and rollback mechanism, and wherein results of the execution of the translated code are to be discarded when one of an interrupt and an exception occurs before completion of the execution of the translated code.

14. The processor of claim 7, further comprising circuitry to ensure that jumps from the original software code to the translated code do not transfer control to arbitrary locations.

15. The processor of claim 7, wherein the performance measure unit is to pseudo-randomly sample instructions of the original software code to detect the hot spot.

16. The processor of claim 7, further comprising logic of the processor to support memory disambiguation during the execution of the translated code.

17. The processor of claim 7, further comprising logic of the processor to support atomicity during the execution of the translated code.

18. The processor of claim 7, further comprising logic of the processor to ensure consistency of translation associated with the translated code.

19. A processor on a die comprising:
execution units to execute instructions of original software code compiled targeting a first instruction set;
a performance measure unit to detect a hot spot which is to be a loop in the original software code, wherein control is to be passed to a binary translation translator after the detection of the hot spot; and
said execution units also to execute translated code, which is to have been generated by the binary translation translator, from a translation cache,
wherein the translated code is to include both instructions that are included in the first instruction set and instructions that are not included in the first instruction set, wherein the instructions that are not included in the first instruction set are wider hardware vector instructions than all instructions included in the first instruction set, and wherein the wider hardware vector instructions are to be based on vectorization of the loop to operate on vector registers even when an operating system and a virtual machine monitor do not support saving and restoring state to the vector registers.

* * * * *